(12) United States Patent
Yassin et al.

(10) Patent No.: US 12,060,037 B2
(45) Date of Patent: Aug. 13, 2024

(54) METHOD AND SYSTEM FOR CREATION AND APPLICATION OF PARKED VEHICLE SECURITY RULES

(71) Applicant: MOTOROLA SOLUTIONS, INC., Chicago, IL (US)

(72) Inventors: Hania A Yassin, West Chicago, IL (US); Shanthi Ravindran, Singapore (MY); Daniel Hammond, Maple Ridge (CA)

(73) Assignee: MOTOROLA SOLUTIONS, INC., Chicago, IL (US)

(*) Notice: Subject to any disclaimer, the term of this patent is extended or adjusted under 35 U.S.C. 154(b) by 66 days.

(21) Appl. No.: 18/067,801

(22) Filed: Dec. 19, 2022

(65) Prior Publication Data
US 2024/0198955 A1    Jun. 20, 2024

(51) Int. Cl.
*B60R 25/102* (2013.01)
*B60R 25/104* (2013.01)
*G06Q 50/26* (2012.01)
*G06F 3/0484* (2022.01)

(52) U.S. Cl.
CPC .......... *B60R 25/102* (2013.01); *B60R 25/104* (2013.01); *G06Q 50/265* (2013.01); *G06F 3/0484* (2013.01)

(58) Field of Classification Search
CPC .. B60R 25/102; B60R 25/104; G06Q 50/265; G06F 3/0484
See application file for complete search history.

(56) References Cited

U.S. PATENT DOCUMENTS

| | | | |
|---|---|---|---|
| 8,880,291 B2 | 11/2014 | Hampiholi | |
| 9,734,462 B2 | 8/2017 | Ioli | |
| 10,518,750 B1 | 12/2019 | Zhang et al. | |
| 11,243,959 B1* | 2/2022 | Gilboa | G06F 16/285 |
| 2014/0334684 A1 | 11/2014 | Strimling | |
| 2015/0170518 A1* | 6/2015 | Rodriguez Garza | G08G 1/144 340/932.2 |
| 2017/0323227 A1* | 11/2017 | Sadeghi | G06Q 20/102 |
| 2018/0151063 A1 | 5/2018 | Pun et al. | |

\* cited by examiner

*Primary Examiner* — Brian Wilson (57) ABSTRACT

A method and system for creation and application of parked vehicle security rules is disclosed. The method includes transmitting, over at least one network to be received via a web-operative interface of an at least one remote system, the parking location and time duration information of a vehicle for enabling creation of a theft alert rule within the at least one remote system. The theft alert rule may be based on a combination of: the vehicle remaining at a parking location for the time duration (i.e. the time duration being a defined part of the parking location and time duration information); and identification data corresponding to the vehicle.

20 Claims, 6 Drawing Sheets

METHOD AND SYSTEM FOR CREATION AND APPLICATION OF PARKED VEHICLE SECURITY RULES

BACKGROUND

Vehicle-related thefts are among some of the more common offenses for which a police response is called for. Thefts of vehicles include thefts for joyriding, thefts for prolonged vehicle use, and thefts for export or "chopping" (disassembling vehicles for spare parts). Thefts often occur when vehicles are parked on the street or on the owner's property, because this is where vehicles usually are. Vehicles can be parked for long or short periods of time, and vehicle thefts can occur in both scenarios. Having an anti-theft system installed in a vehicle can act as a deterrence to thieves; however even effective anti-theft systems cannot fully eliminate the risk of theft occurrence.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

In accordance with one example embodiment, there is provided a computer-implemented method including generating a user interface to interactively receive, as parking location and time duration information, a parking location and time duration for a parking of a vehicle. The vehicle corresponds to one of a plurality of vehicle registrations stored in a database. The computer-implemented method also includes transmitting, over at least one network to be received via a web-operative interface of an at least one remote system, the parking location and time duration information for enabling creation of a theft alert rule within the at least one remote system. The theft alert rule is based on a combination of the vehicle remaining at the parking location for the time duration; and identification data, stored in the database, corresponding to the vehicle. The computer-implemented method also includes receiving a notification from the at least one remote system, at least in part responsively to generated sensor data indicative of the vehicle having been moved from the parking location during the time duration. The notification corresponds to conditions of the theft alert rule having been satisfied. The notification also provides evidentiary details, corresponding to the generated sensor data that is originating contemporaneous in time with when the vehicle is supposed to be parked at the parking location. The computer-implemented method also includes outputting the notification in a human perceivable format to elicit a response from a recipient of the notification.

In some implementations, the above-mentioned notification may further provide time sensitivity information that informs a user of how long the user has to dismiss the notification to avoid an emergency action being initiated.

In some implementations, the above-mentioned theft alert rule may further include a sub-rule that a particular person is not allowed to be driving the vehicle away from the parking location during the time duration, and the theft rule being satisfied may include identifying the particular person as a driver of the vehicle away from the parking location during the time duration.

In some implementations, the above-mentioned notification may be provided to the user along with an actionable element that, when activated, effects a further notification to be transmitted, that includes the evidentiary details, to a local public safety agency as a report of a theft of the vehicle.

In accordance with another example embodiment, there is provided a client system that is configured to communicate over at least one network with at least one remote system having a web-operative interface and a computer readable medium that includes a database storing a plurality of vehicle registrations. The client system includes at least one computing terminal that is configured to generate a user interface to interactively receive, as parking location and time duration information, a parking location and time duration for a parking of a vehicle. The vehicle corresponds to one of the vehicle registrations in the database. The at least one computing terminal is also configured to transmit, over the at least one network for receiving via the web-operative interface to enable creation of a theft alert rule within the at least one remote system, the parking location and time duration information. The theft alert rule is based on a combination of: the vehicle remaining at the parking location for the time duration; and identification data, stored in the database, corresponding to the vehicle. The at least one computing terminal is also configured to receive a notification on the at least one computing terminal, at least in part responsively to generated sensor data indicative of the vehicle having been moved from the parking location during the time duration. The notification corresponds to conditions of the theft alert rule having been satisfied, and provides evidentiary details, corresponding to the generated sensor data that is originating contemporaneous in time with when the vehicle is supposed to be parked at the parking location. The at least one computing terminal is also configured to output the notification via a display or microphone of the at least one computing terminal to elicit a response from a user of the at least one computing terminal.

Each of the above-mentioned embodiments will be discussed in more detail below, starting with example system and device architectures of the system in which the embodiments may be practiced, followed by an illustration of processing blocks for achieving an improved technical method, device, and system for creation and application of parked vehicle security rules.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (Saas), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

The term "vehicle" as used herein is understood to include any of a car, a truck, a van, a Sport Utility Vehicle (SUV), a bus, a motorcycle, a scooter, and the like.

The term "parking" or "parked" as used herein is understood to include not only the case where a vehicle is left completely stationary at an exact geographic location, but also those cases where a vehicle remains within some fixed distance of a premises (such as would be the case where, for example, a vehicle is left with it keys at a repair shop, the vehicle is left with it keys at a valet service, etcetera).

Figure 1:
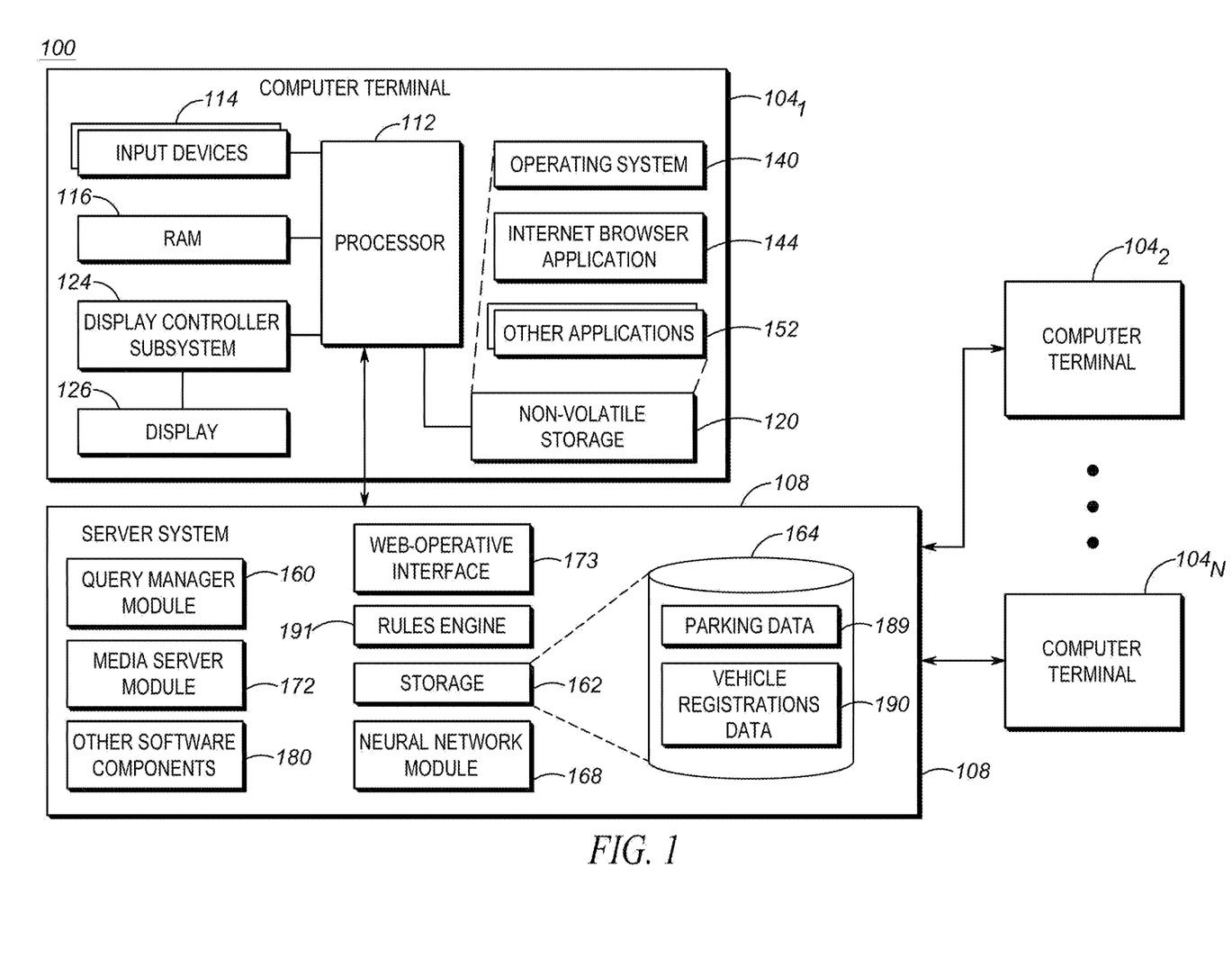
FIG. 1 is a block diagram of a computer system in accordance with example embodiments.

Referring now to the drawings, and in particular FIG. 1, which is a block diagram of an example computer system 100 within which methods in accordance with example embodiments can be carried out. Included within the illustrated computer system 100 are a server system 108 and one or more computer terminals $104_1$-$104_N$ (hereinafter interchangeably referred to as "computer (or computing) terminals $104_1$-$104_N$" when referring to all of the illustrated computer terminals, or "computer (computing) terminal 104" when referring to any individual one of the plurality). In some example embodiments, the computer terminal 104 is a personal computer system; however in other example embodiments the computer terminal 104 is a selected one or more of the following: a handheld device such as, for example, a tablet, a phablet, a smart phone or a personal digital assistant (PDA); a laptop computer; a smart television; and other suitable devices. With respect to the server system 108, this could comprise a single physical machine or multiple physical machines. It will be understood that the server system 108 need not be contained within a single chassis, nor necessarily will there be a single location for the server system 108.

In the illustrated example embodiment, the server system 108 is located remote from the computer terminals $104_1$-$104_N$. The computer terminal 104 communicates with the server system 108 through one or more networks. In some examples, these networks may include some combination of communicatively connected wireless and wired networks, and can include the Internet, or one or more other public/private networks coupled together by network switches or other communication elements. The network(s) could be of the form of, for example, client-server networks, peer-to-peer networks, etc. Data connections between the computer terminal 104 and the server system 108 can be any number of known arrangements for accessing a data communications network, such as, for example, dial-up Serial Line Interface Protocol/Point-to-Point Protocol (SLIP/PPP), Integrated Services Digital Network (ISDN), dedicated lease line service, broadband (e.g. cable) access, Digital Subscriber Line (DSL), Asynchronous Transfer Mode (ATM), Frame Relay, or other known access techniques (for example, radio frequency (RF) links). In some examples, the communication mechanisms between the computer terminal 104 and the server system 108 can include: i) Hypertext Transfer Protocol (HTTP) (in some examples, implementing RESTful web service within the computer system 100 is contemplated); or ii) some suitable publisher-subscriber mechanism where a client subscribes in order to receive notifications (for instance, asynchronous notifications) from the server system 108.

The computer terminal 104 includes at least one processor 112 that controls the overall operation of the computer terminal. The processor 112 interacts with various subsystems such as, for example, input devices 114 (such as a selected one or more of a keyboard, mouse, scanner, touch pad, roller ball and voice control means, for example), random access memory (RAM) 116, non-volatile storage 120, display controller subsystem 124 and other subsystems. The display controller subsystem 124 interacts with display screen 126 and it renders graphics and/or text upon the display screen 126.

Still with reference to the computer terminal 104 of the computer system 100, operating system 140 and various software applications used by the processor 112 are stored in the non-volatile storage 120. The non-volatile storage 120 is, for example, one or more hard disks, solid state drives, or some other suitable form of computer readable medium that retains recorded information after the computer terminal 104 is turned off. Regarding the operating system 140, this includes software that manages computer hardware and software resources of the computer terminal 104 and provides common services for computer programs. Also, those skilled in the art will appreciate that the operating system 140 (that includes computer program instructions), internet browser application 144 (that also includes computer program instructions), and other applications 152 (each of which also includes computer program instructions), or parts thereof, may be temporarily loaded into a volatile store such as the RAM 116. The processor 112, in addition to its operating system functions, can enable execution of the various software applications on the computer terminal 104.

With reference still to FIG. 1, the server system 108 of the computer system 100 includes a query manager module 160. The query manager module 160 enables various functions in relation to interfacing with the database 164 such as, for example, select query functionality (retrieving information from the database 164) and action query functionality (performing tasks with data for the database 164 such as, for instance, adding data, updating data, etcetera). The server system 108 also includes at least one neural network module 168 (this provides artificial intelligence implemented by, for example, convolutional neural networks or other learning machines) associated with computer vision and other types of processing within the server system 108 that one skilled in the art would understand as employing artificial intelligence. The server system 108 also includes a media server module 172 to control streaming of audio and video data (in any suitable manner as will be readily understood by those skilled in the art). The server system 108 also includes a web-operative interface 173, additional details of which are later herein described.

Regarding the database 164 mentioned above, it is provided in at least one storage 162. In the illustrated example embodiment, the database 164 stores parking data 189 and vehicle registrations 190. The parking data 189 and the vehicle registrations 190 are discussed in more detail later herein.

Still with reference to FIG. 1, the server system 108 also includes other software components 180. These other software components will vary depending on the requirements of the server system 108 within the overall system. As just one example, the other software components 180 might include special test and debugging software, or software to facilitate version updating of modules within the server system 108. The other software components 180 might also include interfacing module(s). For example, a private parking company might manage and control smartphone-based parking payment software that could collect and obtain parking location and time duration information (i.e. which is occurring for a different purpose of calculating a parking fee but, when authorized by the smartphone user, reusable to provide the needed information for creation and maintenance of a theft alert rule within the server system 108).

Figure 2:
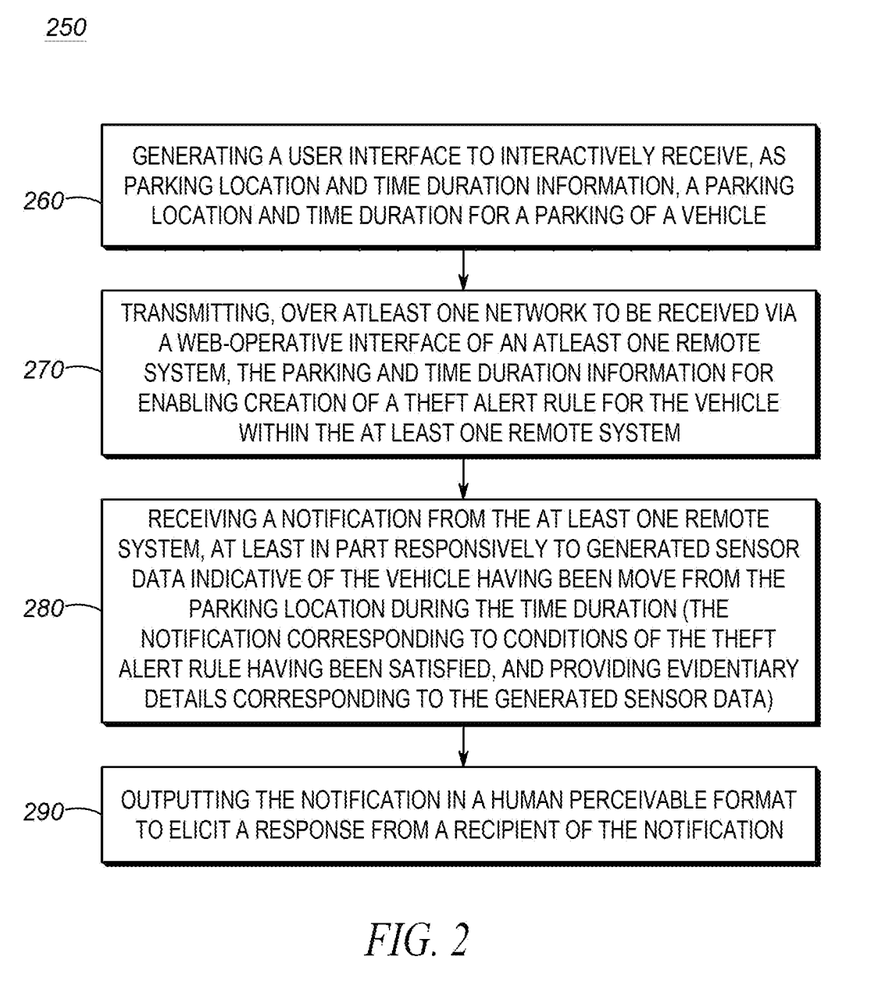
FIG. 2 is a flow chart illustrating a computer-implemented method in accordance with an example embodiment.

Reference is now made to FIG. 2. FIG. 2 is a flow chart illustrating a computer-implemented method 250 in accordance with an example embodiment. Firstly, in the method 250, a user interface is generated (260) to interactively receive, as parking location and time duration information, a parking location and time duration for a parking of a vehicle. Regarding the user interface, in at least one example this may be provided via the computer terminal 104 (FIG. 1), including display of the user interface on the display 126 (further user interface details in accordance with at least one example embodiment are later herein discussed in relation to FIGS. 4 and 5).

In at least one example, the above-referenced vehicle (which upon being parked may have its parking location and parking duration defined and stored) is corresponding to one of a plurality of vehicle registrations in the vehicle registrations data 190 stored in the database 164.

Figure 3:
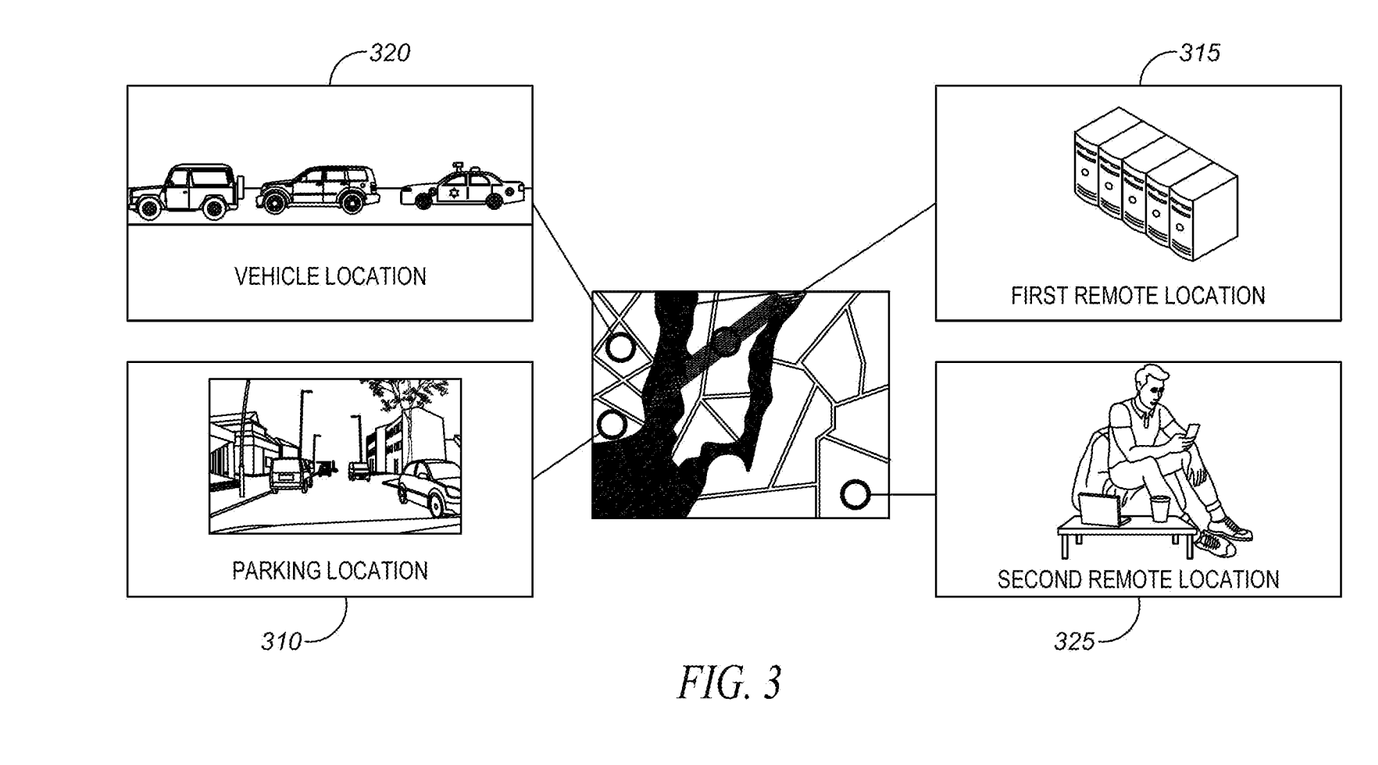
FIG. 3 is a diagram of example locations relevant to further illustrating operation of the computer system in accordance with an example embodiment.

Without closing out the FIG. 2 discussion, FIG. 3 is a diagram of example locations relevant to further illustrating operation of the computer system 100 in accordance with an example embodiment. In FIG. 3, illustrated parking location 310 is an example of a parking location component of the above-referenced parking location and time duration information entered as part of the action 260.

Next in the method 250 of FIG. 2, the parking location and time duration information are transmitted (270) over at least one network (for example, the computer terminal 104 shown in FIG. 1 may output the parking location and time duration information) to be received via the web-operative interface 173 of an at least one remote system (such as, for example, the server system 108 which may be located at, for instance, first remote location 315 shown in FIG. 3). The parking location and time duration information (which may, for example, be converted into entries forming a part of parking data 189 in FIG. 1) enable creation of a theft alert rule within the at least one remote system (theft alert rules may be, for example, managed and maintained by rules engine 191). The theft alert rule is based on a combination of the vehicle remaining at the parking location for the time duration, and identification data corresponding to the vehicle (for example, identification data corresponding to the vehicle may be included in the vehicle registrations data 190 stored in the database 164).

Next in the method 250, a notification is received (280) from the at least one remote system. The action 280 is at least in part occurring responsively to generated sensor data indicative of the vehicle having been moved from the parking location during the time duration. For example, an in-vehicle camera (installed or otherwise provided at the police vehicle shown in FIG. 3) or some other camera (for example, a camera that is a part of a plurality of electronic modules integrated into a smart lamppost, an Automatic License Plate Recognition (ALPR) camera at a traffic intersection or other road-proximate location, etcetera) may obtain image-based confirmation of the vehicle at a vehicle location 320 which does not correspond to the parking location 310. It is also contemplated that other types of sensor devices that do not necessarily capture image data might generate another type of sensor data (e.g. Global Positioning System data that can be said to correspond to a location of the vehicle) that is indicative of the vehicle having been moved from the parking location during the time duration. More generally, evidentiary details provided by the notification may, by data derived from an image or a video, or by other suitable data obtained in some manner, evidence a geographic location of the vehicle that is inconsistent with parking location coordinates contained in the parking location and time duration information. Also, it will be understood that redundancy may improve the chances that a thief is unable to bypass all mechanisms that would result in potential early detection of a vehicle theft. For example, license plates can be removed to reduce effectiveness of ALPR cameras, an in-vehicle Global Positioning System (GPS) device can be disabled or removed, etc.

The above-mentioned notification also corresponds to the conditions of the theft alert rule having been satisfied. For example, after receiving the image-based confirmation (or other evidentiary details) sent to the server system 108 (at the first remote location 315) from the vehicle location 320, the rules engine 191 may determine that conditions of the theft alert rule having been satisfied.

The above-mentioned notification also provides evidentiary details, corresponding to the generated sensor data that is originating contemporaneous in time with when the vehicle is supposed to be parked at the parking location. For instance, GPS location coordinates, image(s) and/or video clips, etcetera are examples of evidentiary details that could be provided as part of the notification. In at least one example, the notification may also include words to help someone receiving the notification quickly understand what has apparently transpired. For example, the words might be something along the lines of the following: "your vehicle should be parked at your place of residence, but it just got photographed out on the road."

Lastly, the method 250 includes outputting (290) the notification in a human perceivable format to elicit a response from a recipient of the notification. For example, a person (such as for instance, the owner of the vehicle) may be present at second remote location 325 with the computer terminal 104, which may output the notification that is read or listened to by the person.

Figure 4:
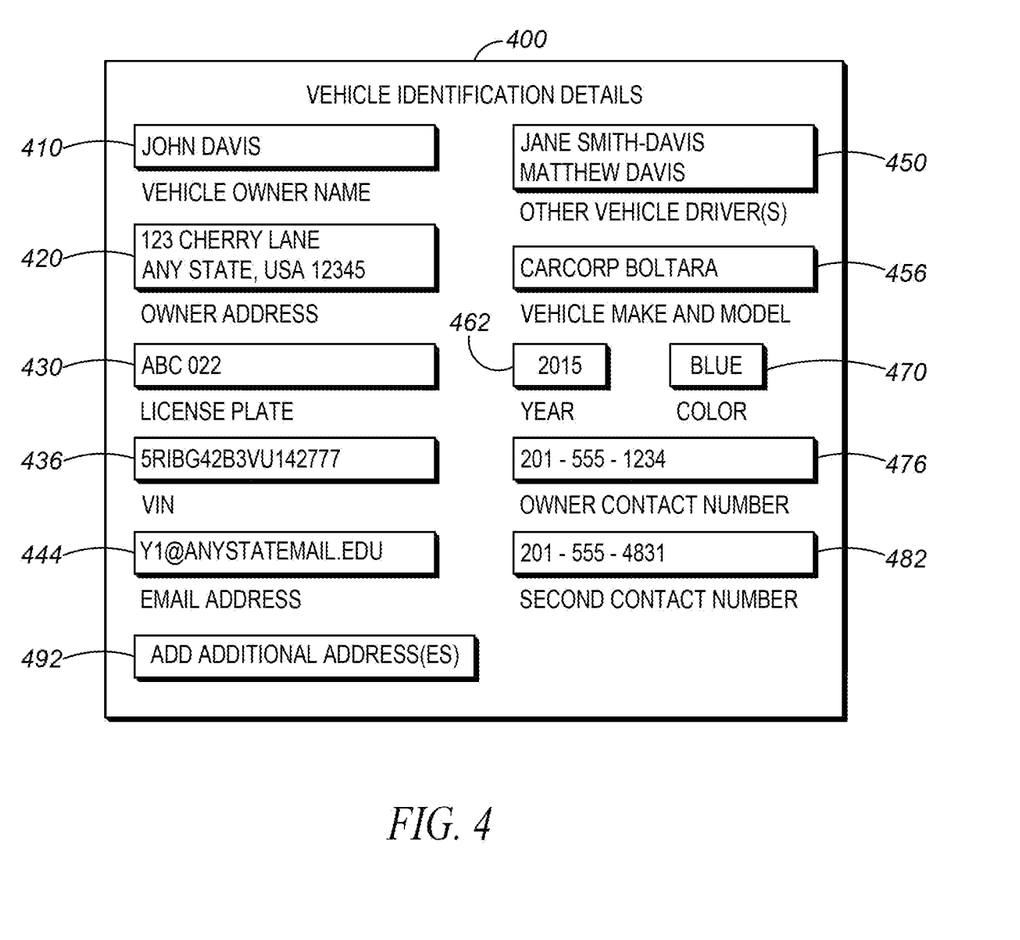
FIG. 4 illustrates an example user interface page for registering a vehicle in accordance with an example embodiment.

Reference is now made to FIG. 4. FIG. 4 illustrates an example user interface page 400 for registering a vehicle in accordance with an example embodiment. In some examples, the user interface page 400 (and other user interface pages that are consistent with one or more example embodiments) are web pages that are generated as part of an online portal such as, for instance, a community connect portal or a community engagement portal. The website for a public safety agency (or some other community service-oriented agency or organization) may include such a portal to allow members of the respectively served community to, amongst other things, discuss, inform, share and collaborate on opportunities and issues that are relevant to the community.

Still with reference to FIG. 4, shown within the illustrated user interface page 400 are a plurality of fields 410-482 for completion by a user (for example, the user may be an owner of the vehicle being registered, or alternatively some other concerned person).

Explanation of the Fields 410-482:

Field 410 is "VEHICLE OWNER NAME" (where the user may enter, for example, the first name and the last name of the vehicle owner).

Field 420 is "OWNER ADDRESS" (where the user may enter, for example, the address of the vehicle owner including a street address, possibly a unit or apartment number, state country and a zip code). In at least one example, this field may be, at least in part, auto-complete enabled (meaning that as the user starts typing the address, one or more automatic suggestions appear for selection).

Field 430 is "LICENSE PLATE" (where the user may enter, for example, the license plate number of the vehicle, which in the United States is usually some combination of letters and numbers 6 to 7 characters in length).

Field 436 is "VIN" (where the user may enter, for example, the Vehicle Identification Number (VIN) of the vehicle, which is a unique code, including a serial number, used within vehicle manufacturing industries to identify individual vehicles).

Field 444 is "EMAIL ADDRESS" (where the user may enter, for example, the email address of the vehicle owner).

Field 450 is "OTHER VEHICLE DRIVER(S)" (where the user may enter, for example, the names of one or more non-owners of the vehicle who may drive the vehicle often or periodically).

Field 456 is "VEHICLE MAKE AND MODEL" (where the user may enter, for example, the make and model of the vehicle being registered within the server system 108). This field may be, at least in part, auto-complete enabled.

Field 462 is "YEAR" (where the user may enter, for example, the manufacturing year of the vehicle being registered).

Field 470 is "COLOR" (where the user may enter, for example, the exterior paint color of the vehicle being registered).

Field 476 is "OWNER CONTACT NUMBER" (where the user may enter, for example, the 10 digit phone number of the owner of the vehicle). In at least one example, this information is important for allowing a text message or phone call to be sent to the owner of the vehicle when a potential theft-related notification needs to be sent out.

Field 482 is "SECOND CONTACT NUMBER" (where the user may enter, for example, the 10 digit phone number of a second point of contact other than the owner of the vehicle). In at least one example, this information is important as a backup for allowing a text message or phone call to be sent out when it appears that the owner of the vehicle may not be receiving the potential theft-related notification.

Also shown within the illustrated user interface page 400 is icon 492. The icon 492 is "ADD ADDITIONAL ADDRESS(ES)", and clicking on it may cause, for example, one or more additional fields to appear within the user interface page 400 where a user may enter additional addresses besides the "OWNER ADDRESS" (the field 420). Examples of additional addresses include, for instance, work address, cottage address, transit-proximate parking lot, etc.

Collection of additional information and identification-related data beyond what is described above is contemplated. Relevant photos (such as, for example, a driver photo, a vehicle photo, etcetera) could be uploadable for storage within the database 164 of FIG. 1. Also, additional information collected could include, for instance, vehicle insurance-related information, dashcam access-related information, access-related information for any vehicle tracker for the vehicle, information regarding frequently travelled route(s), etc.

Figure 5:
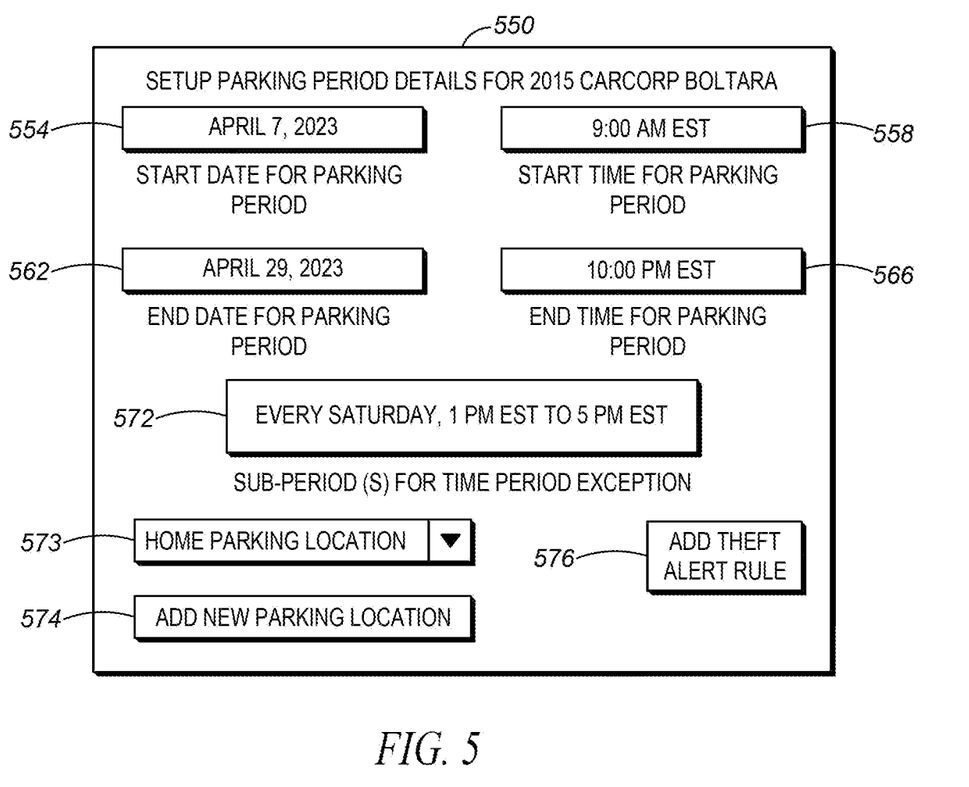
FIG. 5 illustrates an example user interface page for setting up a theft alert rule in accordance with an example embodiment.

Reference is now made to FIG. 5. FIG. 5 illustrates an example user interface page 550 for setting up a theft alert rule in accordance with an example embodiment. Like the user interface page 400, the user interface page 550 includes a plurality of fields for completion by a user as explained in more detail below.

Field 554 is "START DATE FOR PARKING PERIOD" (where the user may, for example, manually type in the starting date of the period for parking of the vehicle "2015 CARCORP BOLTARA", or enter it in some other manner, such as via an interactive calendar tool that pops up when the field 554 is clicked on).

Field 558 is "START TIME FOR PARKING PERIOD" (where the user may, for example, manually type in the hour and minute start time of the period for parking of the vehicle, or enter it in some other manner, such as via an interactive clock tool that pops up when the field 558 is clicked on).

Field 562 is "END DATE FOR PARKING PERIOD" (where the user may, for example, manually type in the ending date of the period for parking of the vehicle, or enter it in some other manner, such as via an interactive calendar tool that pops up when the field 562 is clicked on).

Field 566 is "END TIME FOR PARKING PERIOD" (where the user may, for example, manually type in the hour and minute start time of the period for parking of the vehicle, or enter it in some other manner, such as via an interactive clock tool that pops up when the field 566 is clicked on).

Field 572 is "SUB-PERIOD(S) FOR TIME PERIOD EXCEPTION" (where the user may, for example, manually type in, or enter via interactive clock/time-setting tools, one or more sub-periods of exception for when the theft alert rule will not apply during the larger defined parking period).

Creating exception(s) for the theft alert rule may be helpful in various circumstances. For example, say parent(s) of a teenage child go on a vacation and leave their vehicle parked in their garage or the driveway of their home (a residential premises). If the teenage child is legally able to drive the parked vehicle, the parent(s) may give instructions to the teenage child that he/she may drive the vehicle on certain day(s) and/or within certain hours. Accordingly, information added to the field 572 may reflect (e.g. match) the day/time driving conditions that the parent(s) communicated to the teenage child.

Drop-down selector 573 is for selecting a parking location that has already been registered (i.e. stored in the database 164 of FIG. 1). By actuating the drop-down selector 573, a list will appear (i.e. drop-down) within the user interface page 550, and one of a plurality of selections will be available to be selected (such as, for instance, "HOME PARKING LOCATION", or some other registered parking location, like a work parking location).

Icon 574 is "ADD NEW PARKING LOCATION", which the user can click on if there is no matching address amongst the selections provided via the drop-down selector 573. In such case, clicking on the icon 574 may cause additional field(s) to appear within the user interface page 550, allowing the user to add, in relation to the vehicle being parked, a new parking location (any suitable previously unregistered parking location is contemplated including, for example, valet parking location, service shop parking location, movie theatre parking location, grocery store parking location, mall parking location, etcetera).

Finally, icon 576 is "ADD THEFT ALERT RULE", which the user clicks on after all other fields within the Graphical User Interface (GUI) are complete, and thereby initiating creating of the theft alert rule. For example, clicking on the icon 576 may correspond to a transition from the action 260 in FIG. 2 to the action 270 (and thereafter a creation and storing of the theft alert rule may occur, e.g. creating and storing within the database 164 shown in FIG. 1).

Figure 6:
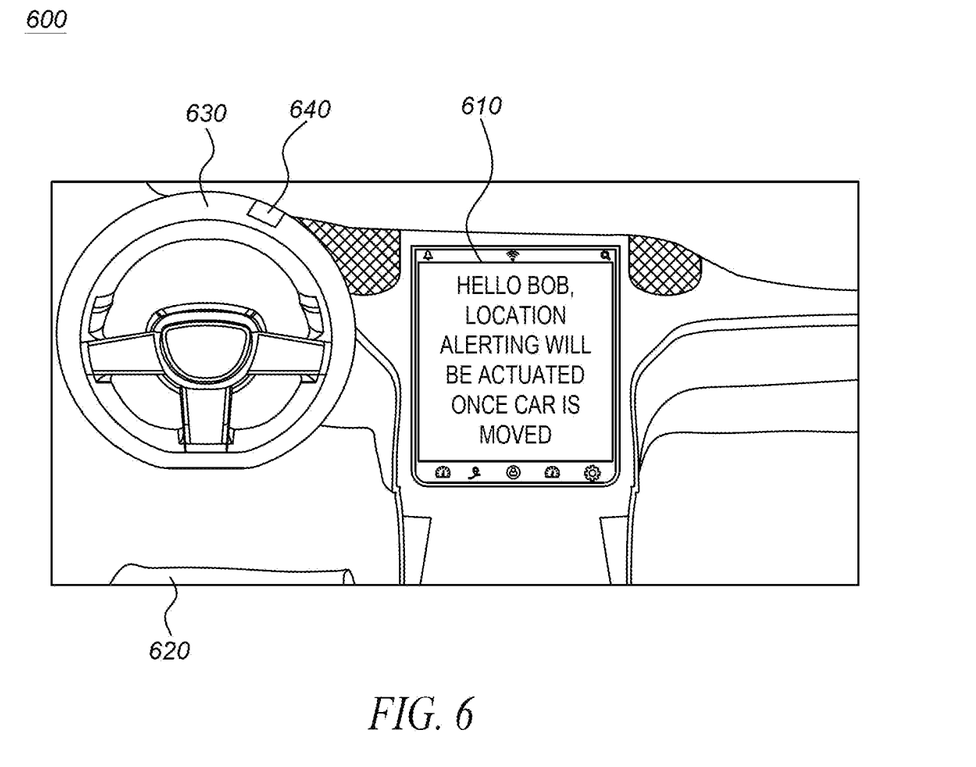
FIG. 6 is a diagram of a center console and steering region of a vehicle in accordance with an example embodiment.

Reference is now made to FIG. 6. FIG. 6 is a diagram of a center console and steering region 600 of a vehicle in accordance with an example embodiment. Within the center console and steering region 600, a touch pad-enabled computer terminal 610 (which may correspond to a specific example of the computer terminal 104 in FIG. 1) is integral or otherwise attached to the vehicle to be readily accessible to a person who may sit in driver's seat 620 of the vehicle.

When a person sits in the driver's seat 620, the person will put their two hands on steering wheel 630 (i.e. as they prepare to start the vehicle in connection with driving away from a parking spot) and one or more fingers of one of the two hands will make contact with fingerprint sensor 640. The fingerprint sensor 640 may be any suitable sensor that allows the person sitting in the driver's seat 620 to be identified (for example, a fingerprint sensor similar to what is disclosed in KR Unexamined Pat Publ. No. 10-2000-0018047 of Lee Hyun Jin). Alternatively, instead of the fingerprint sensor 640, the person sitting in the driver's seat 620 may be identified by, for instance, credentials transfer over Bluetooth from a smart phone or other portable device carried by the person sitting in the driver's seat 620.

Regarding the touch pad-enabled computer terminal 610, it includes a display screen part which is configured to display messages, selectable icons, graphics, etc. For example, the displayed message shown in FIG. 6 is: "HELLO BOB, LOCATION ALERTING WILL BE ACTUATED ONCE CAR IS MOVED." This illustrated message has been generated for display on the touch pad-enabled computer terminal 610 because the following conditions/states were applicable: i) "BOB" has been identified as the person sitting in the driver's seat 620; and ii) a time duration for a parking period has not ended yet, such that a theft alert rule is expected to be triggered if the vehicle is moved away from the parking location. Furthermore, a person reading the displayed message may react to it. For instance, if the person reading the displayed message is able to do so, the person may, for example, login via the touch pad-enabled computer terminal 610 to the appropriate account, and then end the parking session so as to avoid having to later respond to an actually generated theft alert.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot output notifications via a display or a microphone, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A client system configured to communicate over at least one network with at least one remote system having a web-operative interface and a computer readable medium that includes a database storing a plurality of vehicle registrations, the client system comprising:

at least one computing terminal that is configured to:
    generate a user interface to interactively receive, as parking location and time duration information, a parking location and time duration for a parking of a vehicle, wherein the vehicle corresponds to one of the vehicle registrations in the database;
    transmit, over the at least one network for receiving via the web-operative interface to enable creation of a theft alert rule within the at least one remote system, the parking location and time duration information, wherein the theft alert rule is based on a combination of:
        the vehicle remaining at the parking location for the time duration, and
        identification data, stored in the database, corresponding to the vehicle;
    receive a notification on the at least one computing terminal, at least in part responsively to generated sensor data indicative of the vehicle having been moved from the parking location during the time duration, wherein the notification:

corresponds to conditions of the theft alert rule having been satisfied, and
provides evidentiary details, corresponding to the generated sensor data that is originating contemporaneous in time with when the vehicle is supposed to be parked at the parking location; and
output the notification via a display of the at least one computing terminal to elicit a response from a user of the at least one computing terminal, wherein:
the parking location and time duration information includes time period exception information which identifies one or more sub-periods of time within an overall parking period, and
the theft alert rule is not satisfied during the one or more sub-periods of time.

2. The client system of claim 1 wherein the evidentiary details include at least one image captured by a fixed-position security camera showing the vehicle present at a geographic location inconsistent with parking location coordinates contained in the parking location and time duration information.

3. The client system of claim 1 wherein the notification further provides time sensitivity information that informs the user of how long the user has to dismiss the notification to avoid an emergency action being initiated.

4. The client system of claim 1 wherein the theft alert rule further includes a sub-rule that a particular person is not allowed to be driving the vehicle away from the parking location during the time duration, and the theft alert rule being satisfied includes identifying the particular person as a driver of the vehicle away from the parking location during the time duration.

5. The client system of claim 1 wherein the user interface includes a web page generated as part of a community connect portal of a website for a public safety agency.

6. The client system of claim 1 wherein the notification is provided to the user along with an actionable element that, when activated, effects a further notification to be transmitted, that includes the evidentiary details, to a local public safety agency as a report of a theft of the vehicle.

7. The client system of claim 1 wherein the parking location corresponds to a garage or a driveway at a registered residential premises.

8. A client system configured to communicate over at least one network with at least one remote system having a web-operative interface and a computer readable medium that includes a database storing a plurality of vehicle registrations, the client system comprising:
at least one computing terminal that is configured to:
generate a user interface to interactively receive, as parking location and time duration information, a parking location and time duration for a parking of a vehicle, wherein the vehicle corresponds to one of the vehicle registrations in the database;
transmit, over the at least one network for receiving via the web-operative interface to enable creation of a theft alert rule within the at least one remote system, the parking location and time duration information, wherein the theft alert rule is based on a combination of:
the vehicle remaining at the parking location for the time duration, and
identification data, stored in the database, corresponding to the vehicle;
receive a notification on the at least one computing terminal, at least in part responsively to generated sensor data indicative of the vehicle having been moved from the parking location during the time duration, wherein the notification:
corresponds to conditions of the theft alert rule having been satisfied, and
provides evidentiary details, corresponding to the generated sensor data that is originating contemporaneous in time with when the vehicle is supposed to be parked at the parking location; and
output the notification via a display of the at least one computing terminal to elicit a response from a user of the at least one computing terminal,
wherein the notification further provides time sensitivity information that informs the user of how long the user has to dismiss the notification to avoid an emergency action being initiated.

9. The client system of claim 8 wherein the evidentiary details include at least one image captured by a fixed-position security camera showing the vehicle present at a geographic location inconsistent with parking location coordinates contained in the parking location and time duration information.

10. The client system of claim 8 wherein:
the parking location and time duration information includes time period exception information which identifies one or more sub-periods of time within an overall parking period, and
the theft alert rule is not satisfied during the one or more sub-periods of time.

11. The client system of claim 8 wherein the theft alert rule further includes a sub-rule that a particular person is not allowed to be driving the vehicle away from the parking location during the time duration, and the theft alert rule being satisfied includes identifying the particular person as a driver of the vehicle away from the parking location during the time duration.

12. The client system of claim 8 wherein the user interface includes a web page generated as part of a community connect portal of a website for a public safety agency.

13. The client system of claim 8 wherein the notification is provided to the user along with an actionable element that, when activated, effects a further notification to be transmitted, that includes the evidentiary details, to a local public safety agency as a report of a theft of the vehicle.

14. The client system of claim 8 wherein the parking location corresponds to a garage or a driveway at a registered residential premises.

15. A client system configured to communicate over at least one network with at least one remote system having a web-operative interface and a computer readable medium that includes a database storing a plurality of vehicle registrations, the client system comprising:
at least one computing terminal that is configured to:
generate a user interface to interactively receive, as parking location and time duration information, a parking location and time duration for a parking of a vehicle, wherein the vehicle corresponds to one of the vehicle registrations in the database;
transmit, over the at least one network for receiving via the web-operative interface to enable creation of a theft alert rule within the at least one remote system, the parking location and time duration information, wherein the theft alert rule is based on a combination of:
the vehicle remaining at the parking location for the time duration, and identification data, stored in the database, corresponding to the vehicle;

receive a notification on the at least one computing terminal, at least in part responsively to generated sensor data indicative of the vehicle having been moved from the parking location during the time duration, wherein the notification:
   corresponds to conditions of the theft alert rule having been satisfied, and
   provides evidentiary details, corresponding to the generated sensor data that is originating contemporaneous in time with when the vehicle is supposed to be parked at the parking location; and output the notification via a display of the at least one computing terminal to elicit a response from a user of the at least one computing terminal, wherein the theft alert rule further includes a sub-rule that a particular person is not allowed to be driving the vehicle away from the parking location during the time duration, and the theft alert rule being satisfied includes identifying the particular person as a driver of the vehicle away from the parking location during the time duration.

16. The client system of claim 15 wherein the evidentiary details include at least one image captured by a fixed-position security camera showing the vehicle present at a geographic location inconsistent with parking location coordinates contained in the parking location and time duration information.

17. The client system of claim 15 wherein:
   the parking location and time duration information includes time period exception information which identifies one or more sub-periods of time within an overall parking period, and
   the theft alert rule is not satisfied during the one or more sub-periods of time.

18. The client system of claim 15 wherein the notification further provides time sensitivity information that informs the user of how long the user has to dismiss the notification to avoid an emergency action being initiated.

19. The client system of claim 15 wherein the user interface includes a web page generated as part of a community connect portal of a website for a public safety agency.

20. The client system of claim 15 wherein the notification is provided to the user along with an actionable element that, when activated, effects a further notification to be transmitted, that includes the evidentiary details, to a local public safety agency as a report of a theft of the vehicle.

* * * * *